US009465199B2

(12) United States Patent
Nomura et al.

(10) Patent No.: US 9,465,199 B2
(45) Date of Patent: Oct. 11, 2016

(54) IMAGING OPTICAL SYSTEM HAVING BENDING OPTICAL ELEMENT

(71) Applicant: HOYA CORPORATION, Tokyo (JP)

(72) Inventors: Hiroshi Nomura, Saitama (JP); Eijiroh Tada, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/501,816

(22) Filed: Sep. 30, 2014

(65) Prior Publication Data

US 2015/0103417 A1    Apr. 16, 2015

(30) Foreign Application Priority Data

Oct. 15, 2013 (JP) .................................. 2013-214525

(51) Int. Cl.
| G02B 17/00 | (2006.01) |
| G02B 13/00 | (2006.01) |
| G02B 13/04 | (2006.01) |

(52) U.S. Cl.
CPC ......... *G02B 13/0065* (2013.01); *G02B 13/005* (2013.01); *G02B 13/04* (2013.01)

(58) Field of Classification Search
CPC . G02B 13/005; G02B 13/0065; G02B 13/04
See application file for complete search history.

(56) References Cited

U.S. PATENT DOCUMENTS

| 8,395,854 B2 | 3/2013 | Takakubo et al. |
| 8,570,668 B2 | 10/2013 | Takakubo et al. |
| 2006/0092524 A1* | 5/2006 | Konno ............... G02B 13/003 359/678 |
| 2008/0084615 A1* | 4/2008 | Hankawa ............ G02B 15/177 359/683 |
| 2012/0075727 A1 | 3/2012 | Takakubo et al. |

FOREIGN PATENT DOCUMENTS

| JP | 2006-267391 | 10/2006 |
| JP | 2010-243763 | 10/2010 |
| JP | 2013-105049 | 5/2013 |

OTHER PUBLICATIONS

U.S. Appl. No. 13/859,916 to Hiroshi Nomura et al., filed Apr. 10, 2013.

* cited by examiner

*Primary Examiner* — Scott J Sugarman
*Assistant Examiner* — Vipin Patel
(74) *Attorney, Agent, or Firm* — Greenblum & Bernstein, P.L.C.

(57) ABSTRACT

An imaging optical system includes a bending optical element which bends an object-emanating light bundle, a post-bending lens system on a post-bending optical axis defined by the bending optical element, and an image sensor. An effective optical surface of a large-diameter lens element, having a greatest axial light bundle effective radius, is formed into a non-circular shape by making a length of the effective optical surface from the post-bending optical axis toward a side opposite from the object side smaller than the axial light bundle effective radius, with reference to the axial light bundle effective radius lying on a plane which extends orthogonal to a plane including both the post-bending optical axis and a pre-bending optical axis of the imaging optical system and includes the post-bending optical axis.

7 Claims, 5 Drawing Sheets

IMAGING OPTICAL SYSTEM HAVING BENDING OPTICAL ELEMENT

BACKGROUND OF THE INVENTION

1. Field of the Invention

The present invention relates to an imaging optical system having a bending optical element.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to be capable of taking such photographic images as a subsidiary function, such as mobile phones equipped with a camera and tablet computers, etc., equipped with a camera, have become widespread, and there has been a demand to miniaturize the imaging units incorporated in these types of mobile electronic devices. In order to miniaturize an imaging unit, it is known to configure an optical system of an imaging unit as a bending optical system which reflects (bends) a light bundle using a reflection surface of a reflecting element (bending optical element) such as a prism or a mirror. An imaging optical system having at least one bending optical element (hereinafter also referred to as a "bending optical system") is advantageous in achieving a reduction in thickness of the imaging unit, especially in the travelling direction of the incident light emanating from an object to be photographed.

On the other hand, in an imaging optical system, which can be reduced in thickness, the imaging optical system has also been required to have a small F-number. Designing the imaging optical system to have a small F-number usually causes the lens diameter to increase, thus being incompatible with the demand for slimming. In the case of an imaging optical system which includes a reflection surface (bending optical element) in a lens group that is provided closest to the object side, since a lens group that allows a light bundle having a large axial light-bundle effective diameter (axial light bundle diameter) to pass through lies on a post-bending optical axis (i.e., an optical axis optically behind the reflection surface), if the imaging optical system is designed to have a small F-number, the aforementioned lens group (lying on the post-bending optical axis) also increases in size, which inhibits a reduction in thickness of the imaging unit.

A non-circular lens element, which is formed as a circular lens element with an outer edge section thereof partly cut off to miniaturize the lens element (or reduce the diameter of the lens element), is known in the related art (disclosed in Japanese Unexamined Patent Publication Nos. 2006-267391, 2010-24376 and 2013-105049). However, the non-circular lens elements disclosed in the above-mentioned disclosures of the related art are each designed based on the technical idea of removing portions of the lens element through which only light rays that reach the outer side of the imaging surface pass due to the imaging surface (image pickup device/image sensor) of an imaging optical system, which includes such a non-circular lens, being rectangular (non-circular) in shape. Accordingly, in such non-circular lens elements of the related art, sections of the lens element through which only off-axis light rays reaching the outer side of the imaging surface pass and are positioned outside the axial light bundle effective radius are merely cut off. The axial light bundle effective radius is defined by the length of a perpendicular line which connects the optical axis with a point of intersection between an optical surface of the lens element and a light ray which passes through the outermost peripheral edge of the lens element among a group of light rays (light bundle) emerging from an object point on the optical axis and reaching an image point on the optical axis through the optical system. Hence, the reduction in diameter (miniaturization) of the lens (lens group) is not sufficient, and accordingly, the bending optical system cannot be sufficiently reduced in thickness even any such non-circular lens elements of the related art are adopted.

SUMMARY OF THE INVENTION

Based on the above described technical background, the present invention provides an imaging optical system having one or more bending optical elements, wherein the imaging optical system makes it possible to strike a balance between a reduction in F-number and a further reduction in thickness of the imaging optical system.

The present invention has been devised to achieve a further reduction in thickness of the imaging optical system by cutting off a specific portion of an effective optical surface (a surface through which light rays involved in image formation pass) of a lens element within the axial light bundle effective radius (i.e., cutting out a portion of the light rays that are involved in image formation) with reference to the axial light bundle effective radius.

The present invention concentrates on the shape of an effective optical surface of a large-diameter lens element having the greatest axial light-bundle effective radius among the lens elements that lie on a post-bending optical axis of an imaging optical system; accordingly, the present invention has been devised from the viewpoint that it is possible to reduce the thickness of the imaging optical system while suppressing deterioration of the optical performance thereof via image processing if the large-diameter lens element is formed into an irregular shape (non-circular shape) by making the length of the effective optical surface from the post-bending optical axis toward the side opposite from the object side smaller than the axial light bundle effective radius, with reference to the axial light bundle effective radius lying on a plane which includes the post-bending optical axis and extends orthogonal to a plane including both the post-bending optical axis and the pre-bending optical axis of the imaging optical system. If an effective optical surface of a large-diameter lens element is formed into a non-circular shape, the light bundle incident on an imaging surface becomes asymmetrical, so that a difference in resolving power theoretically occurs between each direction (vertical and horizontal directions). However, no practical problems occur if aberrations are sufficiently corrected, and the problem of peripheral light quantity being asymmetrical can also be corrected by image processing. Additionally, in imaging optical systems, a negative or positive lens element can usually be arranged in front of a bending optical element (on the object side thereof), so that the length of a lens group in the post-bending optical system from the optical axis thereof toward the object side also does not have to be sacrificed.

According to an aspect of the present invention, an imaging optical system is provided, including a bending optical element which bends a light bundle emanating from an object; a post-bending lens system arranged on a post-bending optical axis defined by an optical axis of the imaging optical system being bent by the bending optical element; and an image sensor, on which an image of the object is formed via the post-bending lens system. An effective optical surface of a large-diameter lens element, having an axial light bundle effective radius that is greatest among those of all lens elements of the post-bending lens system, is formed into a non-circular shape by making a length of the effective optical surface from the post-bending optical axis toward a side opposite from the object side smaller than the axial light bundle effective radius, with reference to the axial light bundle effective radius lying on a plane which includes the post-bending optical axis and extends orthogonal to a plane including both the post-bending optical axis and a pre-bending optical axis of the imaging optical system.

The axial light bundle effective radius that is greatest among those of all lens elements of the post-bending lens system can be determined with reference to the axial light bundle effective radius lying on a plane which includes the post-bending optical axis and extends orthogonal to a plane including both the post-bending optical axis and a pre-bending optical axis of the imaging optical system.

It is desirable for the non-circular shape of the effective optical surface to satisfy the following conditions (1) and (2):

$$RU>RL, \text{ and} \quad (1)$$

$$(RU+RL)<2RH, \quad (2)$$

wherein, when viewed in a direction along the post-bending optical axis, assuming a U-direction designates a direction parallel to a pre-bending optical axis and travelling toward the object side, an L-direction designates a direction opposite to the U-direction, and an H-direction designates a direction that is orthogonal to a plane on which both the pre-bending optical axis and the post-bending optical axis lie, RU designates a distance between the post-bending optical axis and an outermost point of the effective optical surface of the large-diameter lens element in the U-direction within the axial light bundle effective radius, RL designates a distance between the post-bending optical axis and an outermost point of the effective optical surface of the large-diameter lens element in the L-direction within the axial light bundle effective radius, and RH designates a distance between the post-bending optical axis and an outermost point of the effective optical surface of the large-diameter lens element in the H-direction within the axial light bundle effective radius.

If the conditions (1) and (2) are not satisfied, it would be difficult to obtain the effect of reducing the thickness of the imaging optical system.

It is desirable for the non-circular shape of the effective optical surface to further satisfy the following condition (3):

$$0.5<\{(RU+RL)/2RH\}<0.9. \quad (3)$$

If the value "(RU+RL)/2RH" becomes less than or equal to 0.5, the difference in resolving power between each direction (vertical and horizontal directions) becomes great, thereby causing deterioration in image quality. If the value "(RU+RL)/2RH" becomes greater than or equal to 0.9, the effect of reducing the thickness becomes insufficient.

It is desirable for the effective optical surface of the large-diameter lens element to be circular in shape except in the L-direction (RU=RH), and, in the L-direction, for the effective optical surface of the large-diameter lens element to include a straight side, which is parallel to the post-bending optical axis and orthogonal to a plane on which both the post-bending optical axis and the pre-bending optical axis lie, to form a D-cut shape.

It is desirable for the imaging optical system to include one of a negative lens element and a positive lens element on the object side of the bending optical element.

It is desirable for the imaging optical system to be a retrofocus type in which a negative lens group and a positive lens group are arranged, as a whole, in that order from the object side, and for the large-diameter lens element to be included in the positive lens group.

The irregular-shaped (non-circular) large-diameter lens element in the imaging optical system which satisfies the conditions (1) and (2) (and (3)) is arranged at a position at which an entrance pupil of the imaging optical system is similar in shape to the effective optical surface of the large-diameter lens element. It is generally the case that an aperture stop installed in an imaging optical system is arranged at a position where an off-axis principal ray intersects the optical axis of the imaging optical system, and that the area of the aperture stop changes the quantity of light reaching an imaging surface; however, the shape (a circle, a rectangle, a triangle, etc.) of the aperture stop as viewed in the optical axis direction does not change the light quantity distribution on the imaging surface. In contrast, the irregular-shaped large-diameter lens element in the imaging optical system according to the present invention is arranged in the vicinity of an aperture stop at a position which defines the shape of the entrance pupil of the imaging optical system (at a position which influences the shape of the entrance pupil), and the shape of an effective optical surface of the irregular-shaped large-diameter lens element also influences the light quantity distribution on the imaging surface.

In other words, the imaging optical system according to the present invention achieves a reduction in thickness thereof is achieved while a desired lens speed (F-number) is obtained (in other words, the lens speed is not sacrificed) by setting the shape of an effective optical surface of the irregular-shaped large-diameter lens element so that, with reference to the area of a circular-shaped entrance pupil for obtaining a desired lens speed (F-number), the area of the irregular-shaped entrance pupil becomes identical to the area of this circular-shaped entrance pupil. Namely, an imaging optical system identical in lens speed to that having a circular entrance pupil can be obtained by satisfying "(the area of the entrance pupil formed by an axial light bundle through a circular aperture)=(the area of the entrance pupil formed by an axial light bundle through an irregular-shaped aperture)." In this connection, in order to use an F-number definition in an optical system having an irregular-shaped aperture, the F-number is calculated from the diameter of the aforementioned reference circular entrance pupil since the F-number is equal to the focal length divided by the entrance pupil diameter (F-number=focal length/entrance pupil diameter).

According to another aspect of the present invention an imaging optical system is provided, including a bending optical element which bends a light bundle emanating from an object; a post-bending lens system arranged on a post-bending optical axis defined by an optical axis of the imaging optical system being bent by the bending optical element; and an image sensor, on which an image of the object is formed via the post-bending lens system. An outer shape of an effective optical surface of a large-diameter lens element, an axial light bundle effective radius of which is the greatest among all lens elements of the post-bending lens system, is formed to be non-circular as viewed in a direction of the post-bending optical axis, and a shape of an entrance pupil of the imaging optical system satisfies the following conditions (1') and (2'):

$$RU' > RL', \text{ and} \tag{1'}$$

$$(RU' + RL') < 2RH', \tag{2'}$$

wherein, when the entrance pupil is viewed in a direction along a pre-bending optical axis, assuming an L'-direction designates direction parallel to the post-bending optical axis and travelling toward the image sensor side, a U'-direction designates a direction opposite to the L'-direction, and an H'-direction designates a direction orthogonal to a plane on which both the pre-bending optical axis and the post-bending optical axis lie, RU' designates a distance between the pre-bending optical axis and an outermost point of the entrance pupil in the U'-direction, RL' designates a distance between the pre-bending optical axis and an outermost point of the entrance pupil in the L'-direction, and RH' designates a distance between the pre-bending optical axis and an outermost point of the entrance pupil in the H'-direction.

It is desirable for the shape of the entrance pupil to further satisfy the following condition (3'):

$$0.5 < \{(RU' + RL')/2RH'\} < 0.9. \tag{3'}$$

The present invention achieves both a reduction in F-number and a further reduction in thickness of the imaging optical system by providing a bending optical system which bends a light bundle emanating from an object, a post-bending lens system which is positioned on a post-bending optical axis that is defined by the optical axis of the imaging optical system being bent by the bending optical element, and an image sensor on which an image of the object is formed via the post-bending lens system; and by the outer shape of an effective optical surface of an irregular-shaped large-diameter lens group, the axial light bundle effective radius of which is the greatest among all the lens elements of the post-bending lens system, being formed to be non-circular as viewed in the direction of the post-bending optical axis.

The present disclosure relates to subject matter contained in Japanese Patent Application No. 2013-214525 (filed on Oct. 15, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

An embodiment of an imaging unit (imaging apparatus) 10 according to the present invention will be discussed below with reference to FIGS. 1 through 6. In the following descriptions, forward and rearward directions, leftward and rightward directions, and upward and downward directions are determined with reference to the directions of the double-headed arrows shown in FIGS. 1 through 6. The object side corresponds to the front side. As shown by the outward appearance of the imaging unit 10 in FIG. 1, the imaging unit 10 has a laterally elongated shape which is slim in the forward/rearward direction and long in the leftward/rightward direction.

Figure 2:
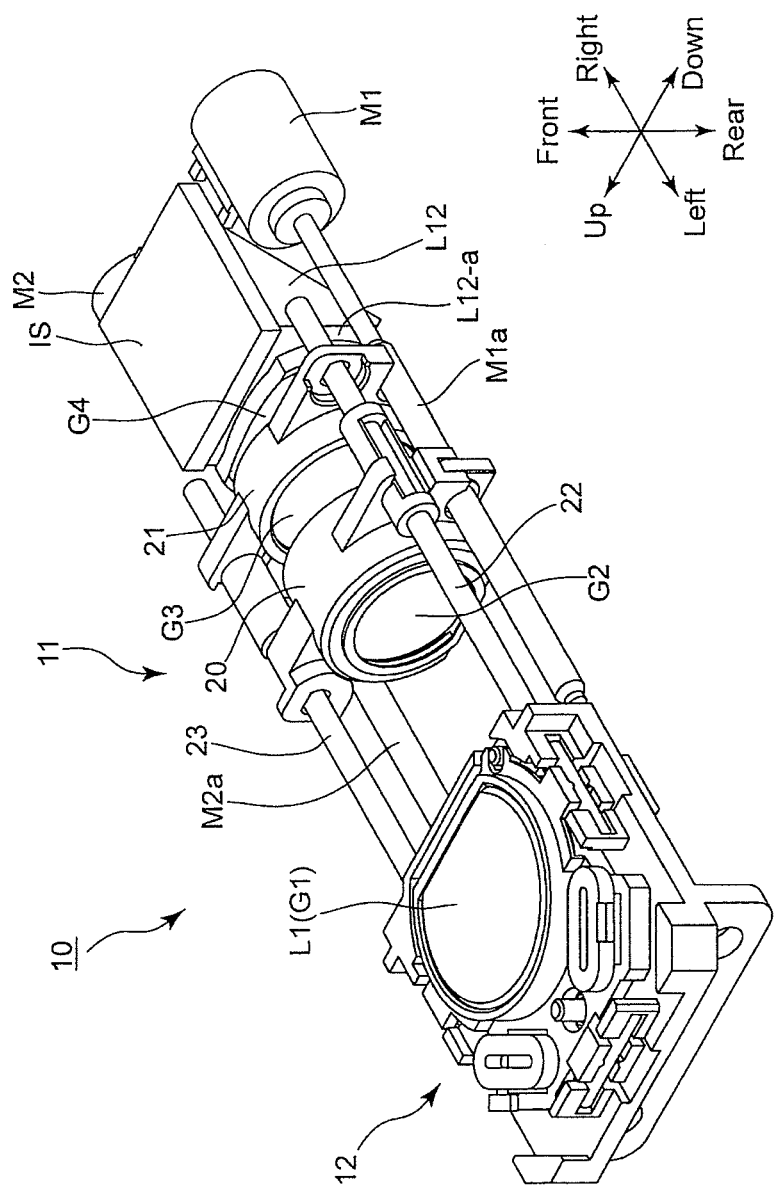
FIG. 2 is a perspective view of the imaging unit with the housing removed, illustrating the internal structure of the imaging unit.
Figure 3:
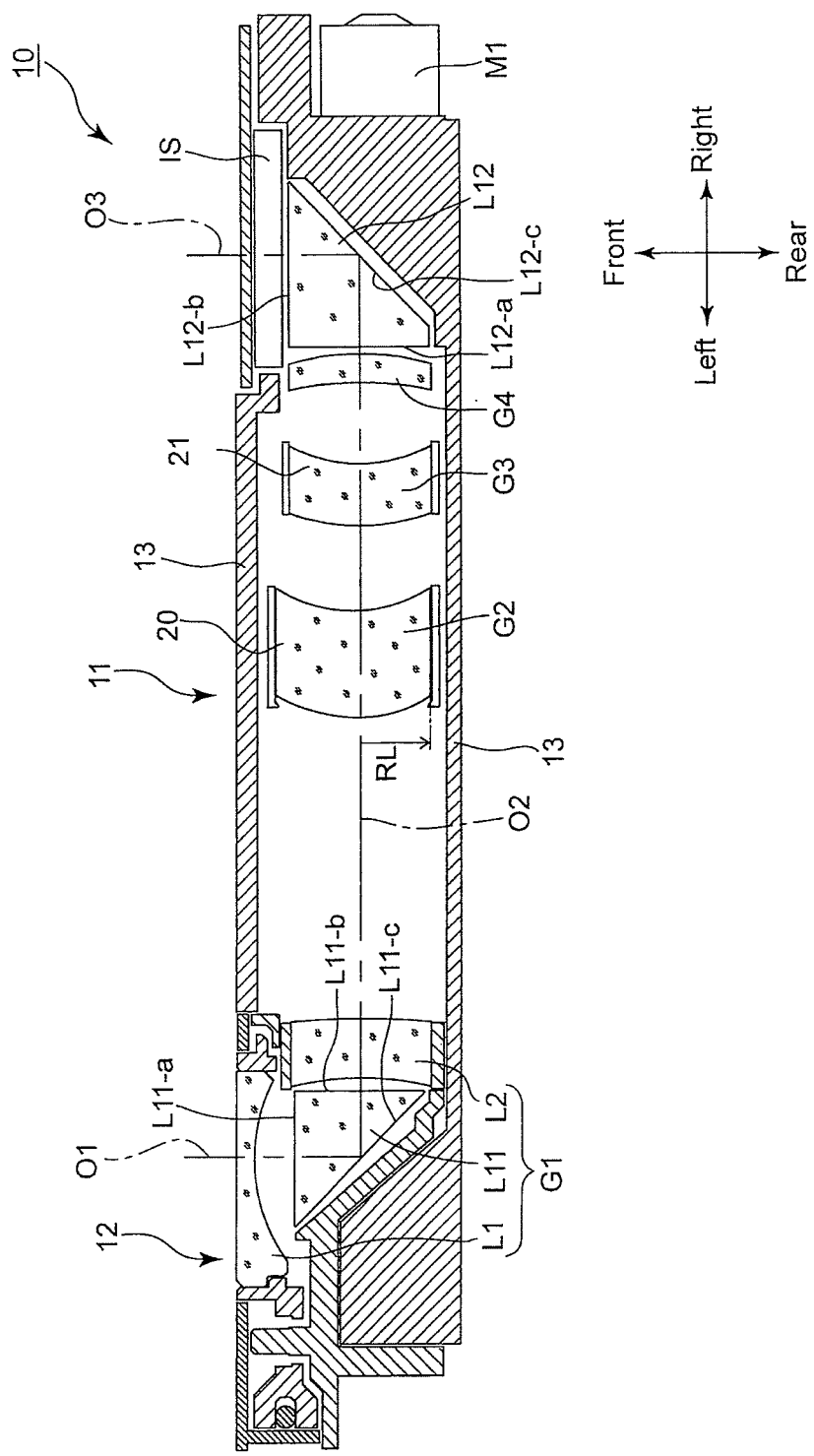
FIG. 3 is a transverse sectional view of the imaging unit taken along the longitudinal direction thereof.

As shown in FIGS. 2 and 3, the imaging unit 10 has an imaging optical system which is provided with a first lens group G1, a second lens group (post-bending optical system) G2, a third lens group (post-bending optical system) G3 and a fourth lens group (post-bending optical system) G4. The first lens group G1 is provided with a first prism (bending optical element) L11, and the imaging unit 10 is provided with a second prism L12 on the right-hand side of the fourth lens group G4. The imaging optical system of the imaging unit 10 is configured as a bending optical system which reflects (bends) a light bundle at substantially right angles at each of the first prism L11 and the second prism L12. As shown in FIG. 3, the first lens group G1 is configured of a first lens element L1, the first prism L11 and a second lens element L2. The first lens element L1 is positioned in front of (on the object side of) an incident surface L11-a of the first prism L11, while the second lens element L2 is positioned on the right-hand side of an exit surface L11-b of the first prism L11. Each of the second lens group G2, the third lens group G3 and the fourth lens group G4 is a lens group which does not include a reflector element such as a prism.

As shown in FIG. 3, an object-emanated light bundle along a first optical axis (pre-bending optical axis) O1, which extends in the rearward direction from the front of the imaging unit 10, and is incident on the first lens element L1 enters the first prism L11 through the incident surface L11-a and is reflected by a reflection surface L11-c of the first prism L11 toward a direction along a second optical axis O2 (post-bending optical axis) (extending in the rightward direction) to exit from the exit surface L11-b of the first prism L11. Subsequently, the light bundle exiting from the exit surface L11-b passes through the second lens element L2 of the first lens group G1 and the second through fourth lens groups G2, G3 and G4 (the second through fourth lens groups G2, G3 and G4 constituting a post-bending lens system), which lie on the second optical axis O2, and enters into the second prism L12 through an incident surface L12-a thereof. Subsequently, the light bundle which is passed through the incident surface L12-a is reflected by a reflection surface L12-c of the second prism L12 in a direction along a third optical axis O3 (extending in the forward direction) and is incident on the imaging surface of an image sensor IS to form an object image thereon. The first optical axis O1 and the third optical axis O3 are substantially parallel to each other and lie, together with the second optical axis O2, on a common plane. This common (imaginary) plane defines a first reference plane (plane including both the pre-bending optical axis and the post-bending optical axis) P1 (see FIG. 5) in which the first optical axis O1, the second optical axis O2 and the third optical axis O3 lie, and an imaginary plane which is orthogonal to the first reference plane P1 and includes the second optical axis O2 is represented by a second reference plane P2 (see FIG. 5). The imaging unit 10 has a shape elongated in a direction along the second optical axis O2, and the first lens element L1 is positioned in the vicinity of an end (the left end) of the imaging unit 10 with respect to the lengthwise direction thereof.

Figure 1:
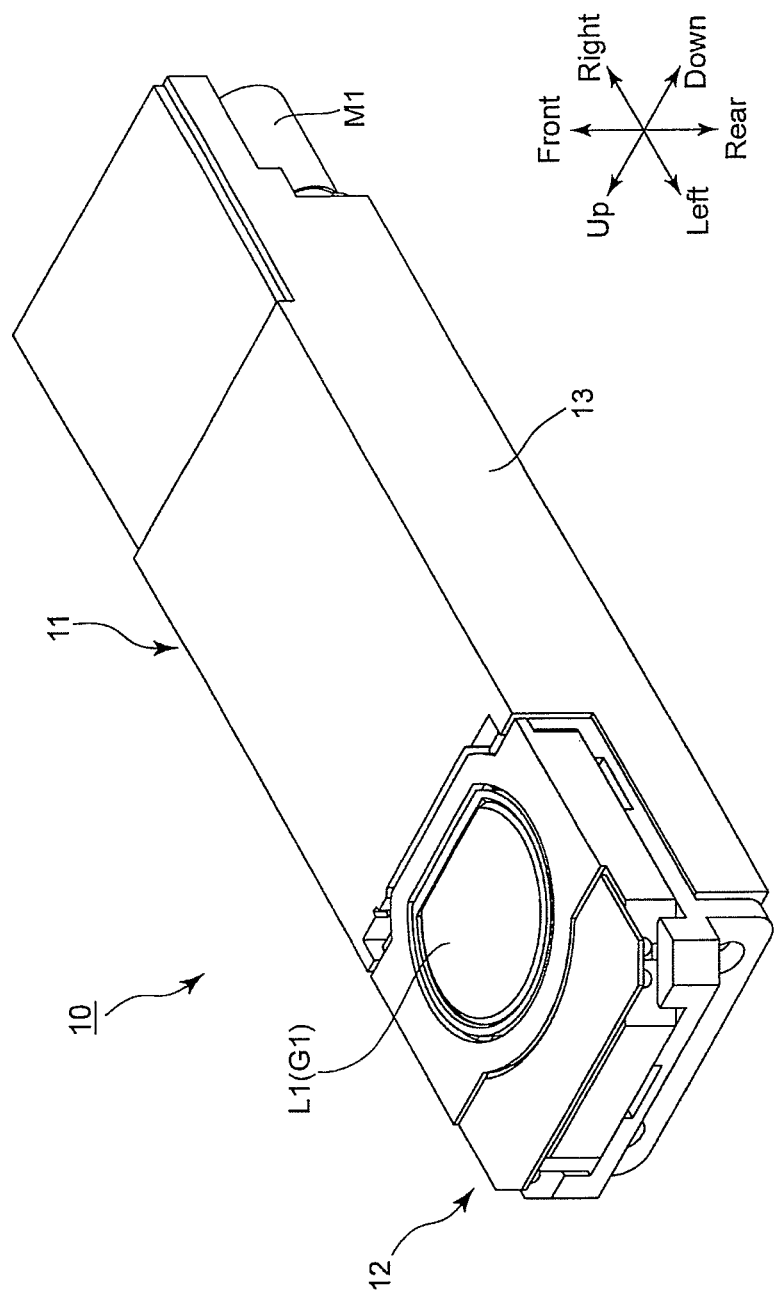
FIG. 1 is a perspective external view of an embodiment of an imaging unit to which the present invention is applied.

As shown in FIGS. 1 through 3, the imaging unit 10 is provided with a body (main) module 11 which holds the second lens group G2, the third lens group G3, the fourth lens group G4, the second prism L12 and the imaging sensor IS, and a first lens-group unit 12 which holds the first lens group G1. The body module 11 is provided with a box-shaped housing 13 which is elongated in the leftward/rightward direction and is small in thickness (slim) in the forward/rearward direction. The first lens-group unit 12 is fixed to one end (the left end) of the housing 13, with respect to the lengthwise direction thereof, and the fourth lens group G4, the second prism L12 and the imaging sensor IS are fixedly held at the other end (the right end) of the housing 13, with respect to the lengthwise direction thereof. However, the configuration of the imaging unit 10 is not limited to the embodiment shown in FIGS. 1 through 3; for example, the body module 11 and the first lens-group unit 12 can alternatively be formed as a single unitary member.

As shown in FIG. 2, the second lens group G2 and the third lens group G3 are held by a second lens group frame 20 and a third lens group frame 21, respectively, which are supported to be movable along the second optical axis O2 by a pair of rods 22 and 23 provided in the housing 13. The imaging unit 10 is provided with a first motor M1 and a second motor M2 which are supported by the housing 13. When the first motor M1 is driven to rotate a screw shaft M1a thereof which projects from the body of the first motor M1, this rotation is transmitted to the second lens group frame 20 to move the second lens group frame 20 along the pair of rods 22 and 23. When the second motor M2 is driven to rotate a screw shaft M2a thereof which projects from the body of the second motor M2, this rotation is transmitted to the third lens group frame 21 to move the third lens group frame 21 along the pair of rods 22 and 23. The imaging optical system of the imaging unit 10 is a zoom lens system (variable-focal length lens system), and a zooming operation (power-varying operation) is performed by moving the second lens group G2 and the third lens group G3 along the second optical axis O2. In addition, a focusing operation is performed by moving the third lens group G3 along the second optical axis O2.

The imaging unit 10 is provided with an anti-shake (image shake correction/image-stabilizing/shake reduction) system that reduces image shake on an image plane which is caused by vibrations such as hand shake. This anti-shake system drives the first lens element L1 of the first lens group G1 in a plane orthogonal to the first optical axis O1. This anti-shake system itself is unrelated to the gist of the present invention, and therefore, the description thereof is omitted from the following descriptions.

Figure 4:
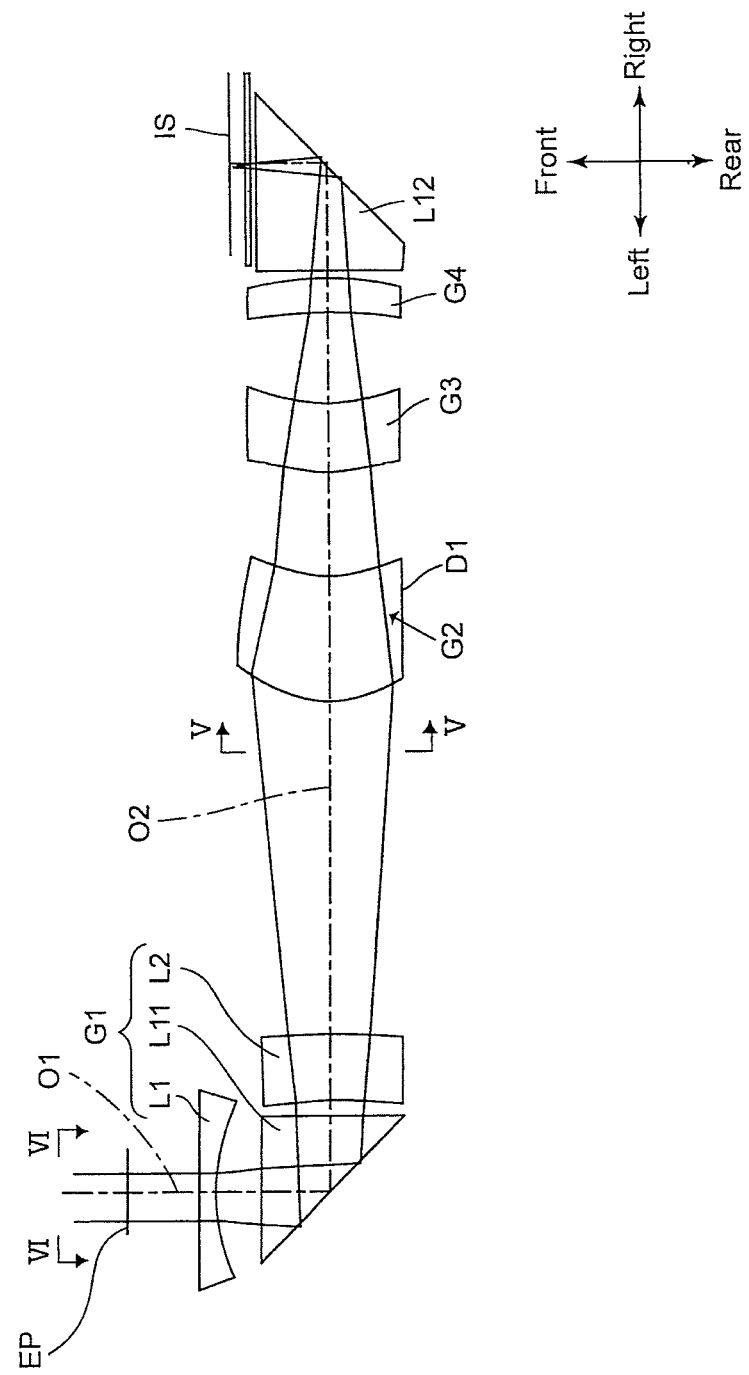
FIG. 4 is a diagram showing the optical arrangement of the optical elements of an imaging optical system, to which the present invention has been applied.

FIGS. 3 through 6 show an embodiment of the imaging optical system of the imaging unit 10, according to the present invention, which is directed to the outer shape (profile) of an effective optical surface of the second lens group G2 (the outer shape of the front effective optical surface of the second lens group G2 as viewed from the left side with respect to FIGS. 3 and 4). This embodiment is a result of the pursuance of the extreme reduction in thickness of the imaging unit 10 (a reduction in the forward/rearward direction thereof) by forming the second lens group G2 into an irregular shape (non-circular). As shown in FIG. 4, the second lens group G2 is a large-diameter lens element (non-circular large-diameter lens element), the axial light bundle effective radius of which is the greatest among those of all lens elements of all the lens groups (G2, G3 and G4) on the second optical axis O2, so that the second lens group G2 becomes an obstacle when attempting to reduce the thickness of the imaging unit 10. The shape of the effective optical surface of the second lens group G2 can be determined in a manner which will be discussed hereinafter. Furthermore, although the second through fourth lens groups G2 through G4 are shown in the drawings as single lens elements, respectively, either or each of the second through fourth lens groups G2 through G4 can be configured of a plurality of lens elements.

First of all, the axial light bundle effective radius of a lens element is a length defined as "the length of the perpendicular line which connects the optical axis with a point of intersection between an optical surface of the lens element and a light ray which passes through the outermost peripheral edge of the lens element among a group of light rays (light bundle) emerging from an object point on the optical axis and reaching an image point on the optical axis through the optical system". The effective optical surface of the second lens group G2 (the surface through which the light bundle reaching the image sensor IS passes) is formed into an irregular shape (non-circular) by making the length (RL) of the effective optical surface from the post-bending optical axis toward the side opposite from the object side (rearward direction) smaller than the axial light bundle effective radius of the irregular shaped large-diameter lens element (the second lens group G2), with reference to the axial light bundle effective radius lying on the second reference plane P2. Furthermore, the ratio of the length of the effective optical surface of the irregular-shaped large-diameter lens element (the second lens group G2) from the post-bending optical axis toward the object side to the length of the effective optical surface of the irregular-shaped large-diameter lens element from the post-bending optical axis toward the side opposite the object side fall within a fixed range.

Figure 5:
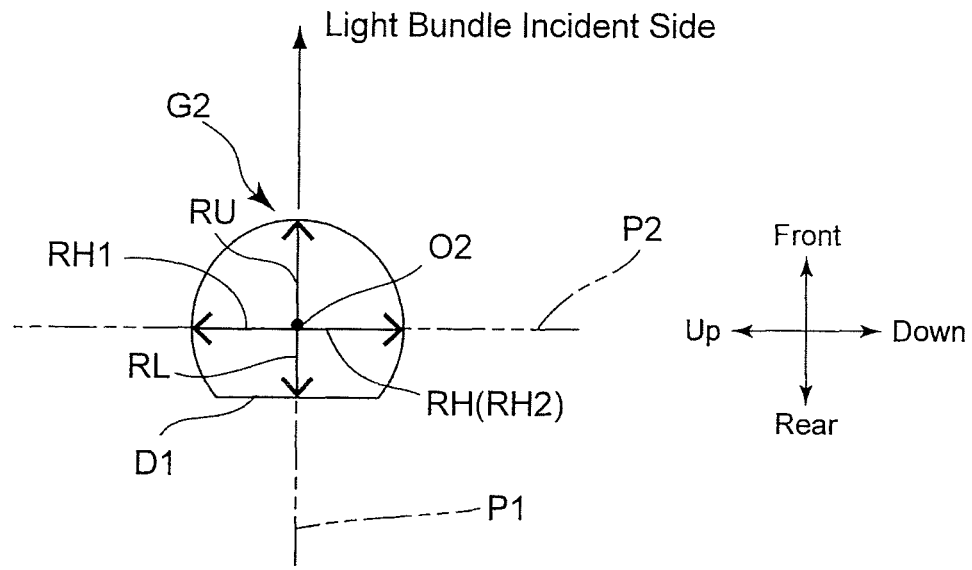
FIG. 5 is a front elevational view, viewed in the direction of the arrows V shown in FIG. 4, of an irregular-shaped large-diameter lens element in the imaging optical system, showing an example of the shape of an effective optical surface of the irregular-shaped large-diameter lens element.

Specifically, assuming that a U-direction designates the direction parallel to the first optical axis O1 and travelling toward the object side (the front side, i.e. the upper side with respect to FIGS. 4 and 5) in the first reference plane P1, an L-direction designates the direction opposite to the U-direction, and an H-direction designates the direction of the second reference plane P2, when the effective optical surface of the second lens group G2 is viewed in a direction along the second optical axis O2 as shown in FIGS. 4 and 5, the outer shape of the effective optical surface satisfies the following conditions (1) and (2):

$$RU>RL, \text{ and} \tag{1}$$

$$(RU+RL)<2RH, \tag{2}$$

wherein RU designates the distance between the optical axis (the second optical axis O2) and the outermost point of the effective optical surface of the second lens group G2 in the U-direction within the axial light bundle effective radius;

RL designates the distance between the optical axis (the second optical axis O2) and the outermost point of the effective optical surface of the second lens group G2 in the L-direction within the axial light bundle effective radius; and RH designates the distance between the optical axis (the second optical axis O2) and the outermost point of the effective optical surface of the second lens group G2 in the H-direction within the axial light bundle effective radius (=the axial light bundle effective radius in the second reference plane P2). As can be understood from FIG. 5, strictly speaking, RH can be defined as two distances, RH1 and RH2, which exist in diametrically opposite directions. These two distances RH1 and RH2 are usually substantially the same, however, in the case where one of the two distances RH1 and RH2 is slightly shorter than the other, the shorter of the two is all that is required to satisfy condition (2); the same is true for condition (3) indicated below.

To satisfy the conditions (1) and (2) means to sacrifice (partly obstruct) the light bundle involved in image formation which passes through the effective optical surface of the second lens group G2 within the axial light bundle effective radius. If the shape of the effective optical surface of the second lens group G2 is determined in this manner, the light bundle incident on the imaging surface becomes asymmetrical in shape, thus advantageously enabling a reduction in thickness of the imaging unit 10 even though a difference (loss) in resolving power theoretically occurs between each direction (vertical and horizontal directions). This loss can be canceled out using an aberration correction technique, and the problem of peripheral light quantity becoming asymmetrical can also be corrected using image processing.

It is desirable for the shape of the effective optical surface of the second lens group G2 to further satisfy the following condition (3):

$$0.5<\{(RU+RL)/2RH\}<0.9. \quad (3)$$

If the value "(RU+RL)/2RH" is equal to or less than 0.5, the difference in resolving power between each direction (vertical and horizontal directions) becomes great, thereby causing deterioration in image quality. If the value "(RU+RL)/2RH" is equal to or greater than 0.9, the effect of reducing the thickness becomes insufficient.

In a desired embodiment, the effective optical surface of the second lens group G2 is circular in shape, defined by the axial light bundle effective radius (i.e., RU=RH, and RH1=RH2), except for the side thereof in the L-direction having a D-cut shape; whereas, the effective optical surface of the second lens group G2 in the L-direction defines a D-cut side (straight side) D1, which is parallel to the second reference plane P2 as shown in FIG. 5.

An object of the present embodiment of the imaging unit 10 is to reduce, in particular, the distance RL in the L-direction on the second lens group G2; the distance RU in the U-direction can be greater than the distance RH in the H-direction (=the axial light bundle effective radius) as required. Since the first lens element L1 is arranged on the light-bundle incident side (the upper side with respect to FIGS. 4 and 5) in the U-direction, the distance RU in the U-direction being greater than the axial light bundle effective radius does not adversely influence the slimming down (reduction in thickness in the forward/rearward direction) of the entire imaging unit 10, and likewise can be said in regard to the radial directions between the U-direction and the H-direction.

Figure 6:
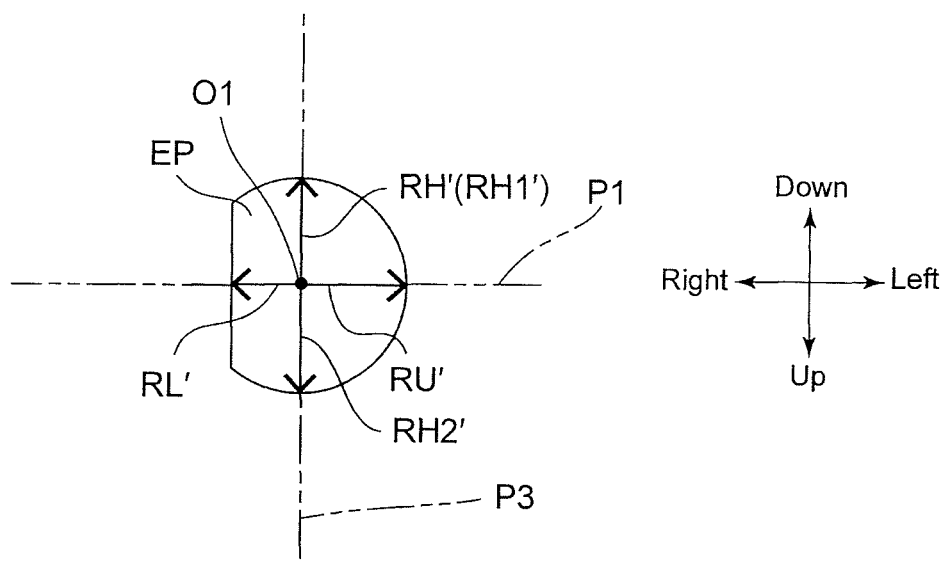
FIG. 6 is a front elevational view, viewed in the direction of the arrows VI shown in FIG. 4, of the entrance pupil of the imaging optical system shown in FIG. 4, showing an example of the shape of the entrance pupil.

Additionally, in the present embodiment of the imaging unit 10, the second lens group G2 is arranged at a position at which the shape of the entrance pupil of the entire imaging optical system becomes similar to the shape of the effective optical surface of the second lens group G2. FIG. 6 shows the shape of the entrance pupil EP of the imaging unit 10. The entrance pupil EP appears to be similar in shape to the effective optical surface of the second lens group G2. In FIG. 6, "P3" shown by a two-dot chain line designates a plane which is orthogonal to the first reference plane P1 and includes the first optical axis O1.

Accordingly, the entrance pupil EP is similar in shape to the effective optical surface of the second lens group G2, and the shape of the entrance pupil EP satisfies the following conditions (1') and (2'); moreover, the shape of the entrance pupil EP further satisfies the following condition (3'):

$$RU'>RL', \quad (1')$$

$$(RU'+RL')<2RH', \text{ and} \quad (2')$$

$$0.5<[(RU'+RL')<2RH']<0.9. \quad (3')$$

wherein, when the entrance pupil EP is viewed in a direction along the pre-bending optical axis (the first optical axis O1), assuming an L'-direction designates the direction parallel to the post-bending optical axis and travelling toward the image sensor side, a U'-direction designates the direction opposite to the L'-direction, and an H'-direction designates the direction orthogonal to a plane including both the pre-bending optical axis and the post-bending optical axis (the first reference plane P1), wherein RU' designates a distance between the optical axis (the first optical axis O1) and the outermost point of the entrance pupil in the U'-direction;

RL' designates a distance between the optical axis (the first optical axis O1) and the outermost point of the entrance pupil in the L'-direction; and RH' designates a distance between the optical axis (the first optical axis O1) and the outermost point of the entrance pupil in the H'-direction. As can be understood from FIG. 6, strictly speaking, RH' can be defined as two distances, RH1' and RH2', which exist in diametrically opposite directions. These two distances RH1' and RH2' are usually substantially the same, however, in the case where one of the two distances RH1' and RH2' is slightly shorter than the other, the shorter of the two is all that is required to satisfy condition (2'); the same is true for condition (3') indicated below.

It is generally the case that an aperture stop installed in an imaging optical system is arranged at a theoretical position at which an off-axis principal ray intersects the optical axis of the imaging optical system and that the area of the aperture stop varies the quantity of light reaching the imaging surface and at which the shape (a circle, a rectangle, a triangle, etc.) of the aperture stop, as viewed in the optical axis direction, does not change the light quantity distribution (peripheral light quantity) on an imaging surface. In contrast, in the present embodiment of the imaging unit 10, the second lens group G2 is not arranged at the theoretical installation position of the aperture stop. Therefore, although the shape of the effective optical surface of the second lens group G2 causes the light quantity distribution on the imaging surface to be asymmetrical, the problem of the light quantity distribution on the imaging surface becoming asymmetrical can be corrected by image processing, as mentioned above.

Although the optical system of the above illustrated embodiment of the imaging unit 10 is provided with the second prism L12, the present invention can also be applied to an imaging optical system which includes no prisms corresponding to the second prism L12. Additionally, although the second lens group G2, the third lens group G3 and the fourth lens group G4 are provided on the second optical axis O2, the present invention can also be applied to a type of imaging optical system in which less than or more than three lens groups are provided on an optical axis of the imaging optical system which corresponds to the second optical axis O2.

Additionally, in the first lens group G1, it is possible to change the number of lens elements arranged in front of the incident surface L11-*a* of the first prism L11 on the first optical axis O1 and the number of lens elements arranged on the right-hand side of the exit surface L11-*b* of the first prism L11 on the second optical axis O2.

Although the imaging optical system of the above illustrated embodiment of the imaging unit 10 is a zoom lens (variable power optical system) which performs a zooming operation (power varying operation) by moving the second lens group G2 and the third lens group G3 along the second optical axis O2, the present invention is also applicable to an imaging apparatus which incorporates an imaging optical system having no power varying capability. For instance, it is possible to modify the imaging unit 10 such that the second lens group G2 and the third lens group G3 do not move for a zooming operation and that the second lens group G2 or the third lens group G3 moves solely for a focusing operation.

Although the incident surface L11-*a* of the first prism L11 in the above illustrated embodiment of the imaging unit 10 is in the shape of a laterally elongated rectangle, the present invention can also be applied to a type of imaging apparatus (imaging optical system) having a first prism (which corresponds to the first prism L11), the incident surface thereof having a different shape such as a square or a trapezoid.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An imaging optical system, comprising:
   a bending optical element which bends a light bundle emanating from an object;
   a post-bending lens system arranged on a post-bending optical axis defined by an optical axis of said imaging optical system being bent by said bending optical element; and
   an image sensor, on which an image of said object is formed via said post-bending lens system;
   wherein an effective optical surface of a large-diameter lens element, having an axial light bundle effective radius that is greatest among those of all lens elements of said post-bending lens system, is configured into a non-circular shape by a length of said effective optical surface from said post-bending optical axis toward a side opposite from the object side being smaller than said axial light bundle effective radius, with reference to said axial light bundle effective radius lying on a plane which includes said post-bending optical axis and extends orthogonal to a plane including both said post-bending optical axis and a pre-bending optical axis of said imaging optical system,
   wherein said non-circular shape of said effective optical surface satisfies the following conditions:

$RU > RL$, $(RU + RL) < 2RH$, and $0.5 < \{(RU + RL)/2RH\} < 0.09$, wherein when viewed in a direction along said post-bending optical axis, where an upper direction designates a direction parallel to a pre-bending optical axis and travelling toward the object side, a lower direction designates a direction opposite to said upper direction, and a horizontal direction designates a direction that is orthogonal to a plane on which both said pre-bending optical axis and said post-bending optical axis lie,
   wherein RU designates a distance between said post-bending optical axis and an outermost point of said effective optical surface of said large-diameter lens element in said upper direction within the axial light bundle effective radius,
   wherein RL designates a distance between said post-bending optical axis and an outermost point of said effective optical surface of said large-diameter lens element in said lower direction within said axial light bundle effective radius, and
   wherein RH designates a distance between said post-bending optical axis and an outermost point of said effective optical surface of said large-diameter lens element in said horizontal direction within said axial light bundle effective radius.

2. The imaging optical system according to claim 1, wherein said axial light bundle effective radius that is greatest among those of all lens elements of said post-bending lens system is determined with reference to said axial light bundle effective radius lying on a plane which includes said post-bending optical axis and extends orthogonal to a plane including both said post-bending optical axis and a pre-bending optical axis of said imaging optical system.

3. The imaging optical system according to claim 1, wherein said effective optical surface of said large-diameter lens element is circular in shape except in said lower direction, and
   wherein, in said lower direction, said effective optical surface of said large-diameter lens element comprises a straight side, which is parallel to said post-bending optical axis and orthogonal to a plane on which both said post-bending optical axis and said pre-bending optical axis lie, to define a D-cut shape.

4. The imaging optical system according to claim 1, further comprising a first lens element on said object side of said bending optical element.

5. The imaging optical system according to claim 1, wherein said imaging optical system is a retrofocus type in which a negative lens group and a positive lens group are arranged, as a whole, in that order from said object side, and
   wherein said large-diameter lens element is included in said positive lens group.

6. The imaging optical system according to claim 1, wherein said large-diameter lens element is at a position at which an entrance pupil of said imaging optical system is similar in shape to said effective optical surface of said large-diameter lens element.

7. An imaging optical system, comprising:
   a bending optical element which bends a light bundle emanating from an object;
   a post-bending lens system on a post-bending optical axis defined by an optical axis of said imaging optical system being bent by said bending optical element; and
   an image sensor, on which an image of said object is formed via said post-bending lens system,
   wherein an outer shape of an effective optical surface of a large-diameter lens element, an axial light bundle effective radius of which is greatest among all lens elements of said post-bending lens system, is formed to be non-circular as viewed in a direction of said post-bending optical axis, and wherein a shape of an entrance pupil of said imaging optical system satisfies the following conditions:

$RU' > RL'$, $(RU' + RL') < 2RH'$, and $0.5 < \{(RU' + RL')/2RH'\} < 0.09$, wherein, when the entrance pupil is viewed in a direction along a pre-bending optical axis, where an lower direction designates a direction parallel to said post-bending optical axis which travels toward the image sensor side, a upper direction designates a direction opposite to said lower direction, and a horizontal direction designates a direction orthogonal to a plane on which both a pre-bending optical axis and said post-bending optical axis lie, RU' designates a distance between said pre-bending optical axis and an outermost point of the entrance pupil in said upper direction, RL' designates a distance between said pre-bending optical axis and an outermost point of the entrance pupil in said lower direction, and RH' designates a distance between said pre-bending optical axis and an outermost point of the entrance pupil in said horizontal direction.

* * * * *